(12) United States Patent
Moden et al.

(10) Patent No.: US 6,549,570 B1
(45) Date of Patent: Apr. 15, 2003

(54) APPARATUS FOR LINE STATE ANALYSIS IN A TELECOMMUNICATIONS SYSTEM

(75) Inventors: Kevin W. Moden, Austin, TX (US); James E. Beard, Liberty Hill, TX (US); Robert B. Black, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/293,475

(22) Filed: Apr. 15, 1999

(51) Int. Cl.[7] ............................................. H04B 17/00
(52) U.S. Cl. .................................... 375/224; 379/26.01
(58) Field of Search ................................. 375/224, 225, 375/228, 373, 375, 376; 327/147; 379/26.01, 27.07

(56) References Cited

U.S. PATENT DOCUMENTS

| | | | |
|---|---|---|---|
| 4,127,816 A | * 11/1978 | Grosso et al. | 370/216 |
| 4,459,437 A | * 7/1984 | Gabry et al. | 379/27.01 |
| 4,920,496 A | * 4/1990 | Szczebak et al. | 375/224 |
| 4,949,355 A | 8/1990 | Dyke et al. | |
| 5,206,886 A | 4/1993 | Bingham | |
| 5,345,437 A | 9/1994 | Ogawa | |
| 5,504,753 A | 4/1996 | Renger et al. | |
| 5,963,059 A | * 10/1999 | Partovi et al. | 327/12 |
| 6,295,313 B1 | * 9/2001 | Noma et al. | 375/219 |

* cited by examiner

Primary Examiner—Stephen Chin
Assistant Examiner—Kevin Kim
(74) Attorney, Agent, or Firm—Baker Botts L.L.P.

(57) ABSTRACT

A line state analyzer (42, 116) is provided for determining if two asynchronous digital subscriber line modems (12, 34) have entered a training stage or if some error has occurred prior to entering the training stage, and to assist in determining which of the modems is at fault. The analyzer includes a frequency detection circuit (50) to detect the various signals exchanged by the modems prior to entering the training stage. The information detected by the detection circuit is presented on a visual display (51, 123). Operator perceptible indicia (51, 119) may be provided to assist the operator in identifying what the line state analyzer has determined.

11 Claims, 3 Drawing Sheets

US 6,549,570 B1

APPARATUS FOR LINE STATE ANALYSIS IN A TELECOMMUNICATIONS SYSTEM

TECHNICAL FIELD OF THE INVENTION

This invention relates in general to telecommunications test equipment and, more particularly, to an apparatus for line state analysis in an asynchronous digital subscriber line system.

BACKGROUND OF THE INVENTION

The use of computers and the amount of data stored on computers has increased each year. Along with the increased use of computers has come an increased need for allowing those computers to communicate. This has led to an increased utilization of existing telecommunication systems for computer-to-computer communication. Methods for increasing the amount of data that can be communicated over existing telecommunication systems have been developed to answer the need for increasing computer-to-computer communication.

Asynchronous digital subscriber line (ADSL) modems are one method that has been developed for communicating increased amounts of data over existing telecommunication systems. ADSL utilizes a two stage protocol involving a pre-training stage and a training stage to establish communication between a pair of ADSL modems. The two ADSL modems are known as the R-modem and the C-modem in the industry. At initialization the R-modem enters an activate request mode and the C-modem enters an idle mode. In the pre-training stage two ADSL modems establish communication using a lock-step series of signals. The first signal is an ACTIVATE REQUEST signal, followed by a C-ACT signal, then an R-ACT signal, and finally a C-REVEILLE signal. After the C-REVEILLE signal the modems enter the training stage.

The development and use of ADSL modems has created many challenges. One such challenge is determining why two ADSL modems are not properly communicating. Currently, when an operator is trying to repair a dead modem or modems, the operator has no knowledge of where to start looking for the problem, because the problem could stem from a variety of sources, such as the modems themselves or the lines connecting the modems. Traditional methods of detecting these problems required the deployment of oscilloscopes, frequency counters, and other complex equipment and often involved opening up the modems themselves.

SUMMARY OF THE INVENTION

From the foregoing, it may be appreciated that a need has arisen for an apparatus for determination of line state and initialization progress between modems, so as to achieve more efficient testing.

According to one form of the present invention, an apparatus is provided to address this need, and involves a communications line interface which can be operatively coupled to a communications line, and a frequency detection circuit operatively coupled to the interface and having an output. The frequency detection circuit is operable to detect through the interface an occurrence of each of a plurality of predetermined frequencies on the communications line and to provide to the output an indication of each such frequency which has been detected.

According to another form of the present invention, a self-contained line state analyzer includes: a communications line interface which can be operatively coupled to and detect signals on a communications line; an operator information portion; and a circuit portion which is operatively coupled to the interface and the operator information portion. The circuit portion is operative to automatically detect through the interface the occurrence of a signal at a predetermined frequency, and to automatically provide on the operator information portion an operator perceptible indication of whether a signal at the predetermined frequency has been detected.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

Figure 1:
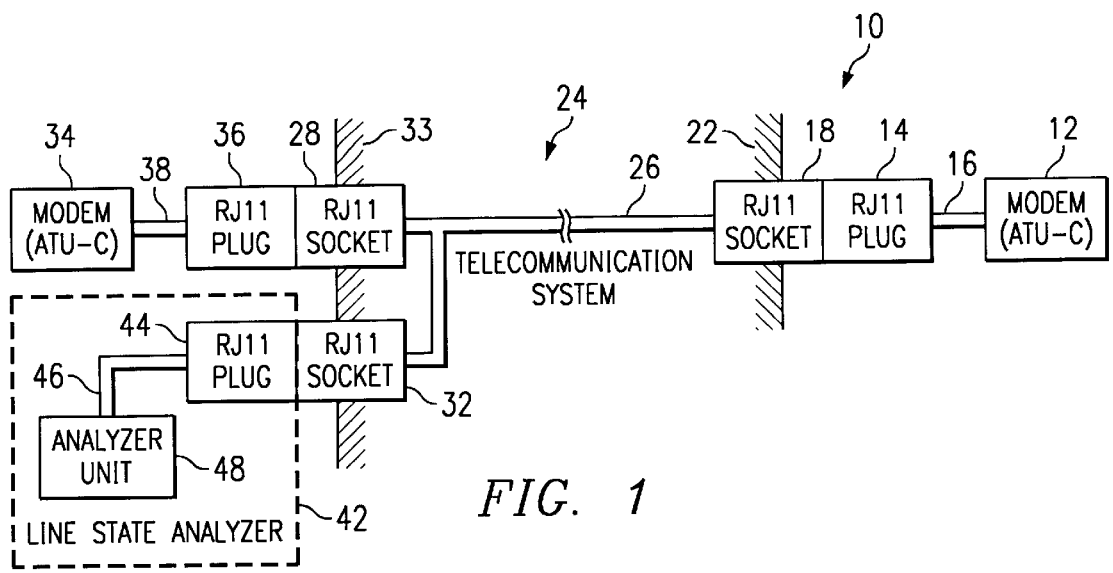
FIG. 1 is a block diagram of an asynchronous digital subscriber line communication system.

FIG. 1 is a block diagram of an asynchronous digital subscriber line communication system (ADSL) 10. The system 10 includes a modem 12 which is a standard ADSL modem. The modem 12 is coupled to an RJ11 plug 14 by a differential transmission line pair 16. An RJ11 socket 18 is releasably coupled to plug 14 and is fixedly disposed within a wall 22 which may be in an office or other building. The RJ11 plug and socket are industry standard modular parts. The socket 18 is coupled to a telecommunication system 24. The telecommunication system 24 includes a plurality of differential transmission line pairs. One of the differential transmission line pairs 26 is coupled to socket 18 and two RJ11 sockets 28 and 32, respectively. The sockets 28 and 32 are each fixedly disposed in a wall 33, and the wall 33 may be in a home or other building. Socket 28 is coupled to a further modem 34, similar to the ADSL modem 12, via an RJ11 plug 36 and a differential transmission line pair 38.

A line state analyzer 42 includes an analyzer case or housing 48 (shown in more detail in association with FIG. 4), an RJ11 plug 44, and a differential line pair 46. The socket 32 is coupled to the analyzer unit 48 via the RJ11 plug 44 and the differential line pair 46. The line state analyzer 42 is described in more detail in association with FIG. 2.

ADSL utilizes a two stage protocol for establishing communication. The two stage protocol involves a training stage and a pre-training stage. The present invention is directed to the pre-training stage. In the pre-training stage two ADSL modems establish communication using a lock-step series of signals. The first signal is an ACTIVATE REQUEST signal, followed by a C-ACT signal, then an R-ACT signal, and finally a C-REVEILLE signal. These signals follow each other in lock-step and are described in more detail below.

Referring to FIG. 1, a communications link is formed between the modem 12 and the modem 34 by the telecommunication system 24 over differential transmission line pair 26, wherein the modem 12 operates as a "C-modem" and modem 34 operates as an "R-modem", where C-modem and R-modem are industry standard terms. When the C-modem 12 is powered up it enters an idle mode wherein the C-modem 12 is quiet and does not transmit. When the R-modem 34 is powered up the R-modem 34 enters an activate request mode. While in the activate request mode the ACTIVATE REQUEST signal is periodically transmitted by the R-modem 34. The ACTIVATE REQUEST signal is a single sinusoid at 34.5 KHz. The ACTIVATE REQUEST signal will be transmitted periodically by the R-modem 34 until the C-ACT signal is received by the R-modem 34 from the C-modem 12. More specifically, the ACTIVATE REQUEST signal will awaken the C-modem 12 and cause the C-modem 12 to transmit the C-ACT signal in an interval between ACTIVATE REQUEST signals. The C-ACT signal is a single sinusoid at 189.75 KHz. The C-ACT signal will be transmitted only once by the C-modem 12. Once the C-ACT signal is received by the R-modem 34, the R-modem 34 transmits the R-ACT signal. The R-ACT signal is transmitted only once by the R-modem 34. The R-ACT signal is a single sinusoid at 51.75 KHz. Once the R-ACT signal is received by the C-modem 12, the C-modem 12 will transmit the C-REVEILLE signal. The C-modem 12 will transmit the C-REVEILLE signal only once. The C-REVEILLE signal is a single sinusoid at 241.5 KHz. After the R-modem 34 has received the C-REVEILLE signal transmitted by the C-modem 12, the training stage of the ADSL modem initialization sequence begins. The training stage is not discussed in detail here.

The line state analyzer 42 is coupled to the differential line pair 26 which forms the actual link between the C-modem 12 and the R-modem 34. The analyzer 42 operates to detect which of the ACTIVATE REQUEST, C-ACT, R-ACT, and C-REVEILLE signals have been transmitted between the C-modem and R-modem 12 and 34.

Figure 2:
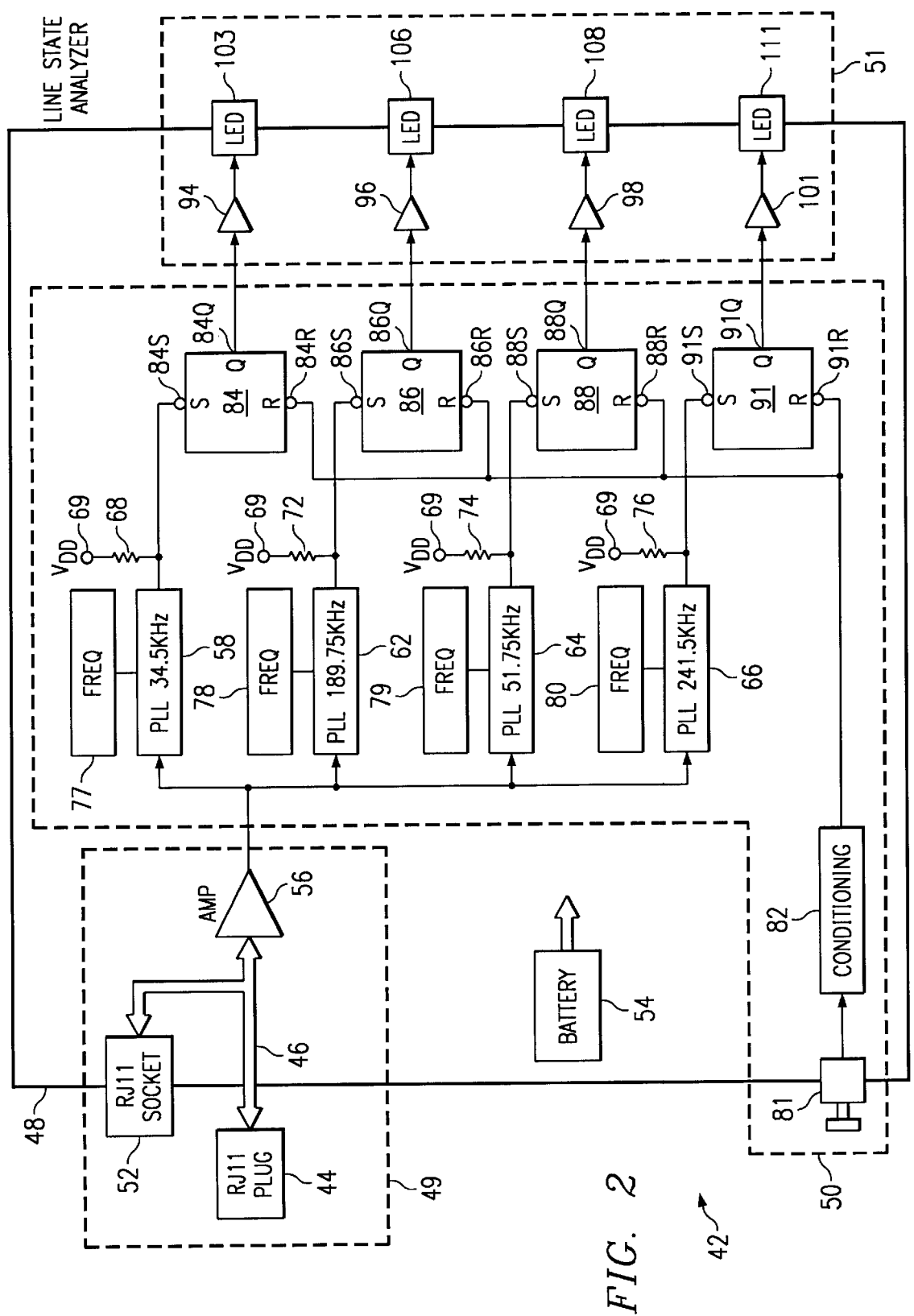
FIG. 2 is a schematic diagram of an embodiment of a line state analyzer which is shown in FIG. 1.

FIG. 2 is a schematic diagram of an embodiment of the line state analyzer 42 FIG. 1. The line state analyzer 42 includes an interface portion 49, a frequency detection circuit 50, a display portion 51 which can provide an operator perceptible display, and a battery 54. The battery 54 provides operating power to the other portions of the line state analyzer 42, including the interface portion 49, frequency detection circuit 50, and display portion 51.

The interface portion 49 includes an RJ11 socket 52 fixedly disposed on the case 48. The socket 52 is coupled to the plug 44 via the differential line pair 46. Interface portion 49 further includes an amplifier 56 which has a differential input coupled to the differential line pair 46. The amplifier 56 is a differential amplifier, of a type well known in the industry, with high input impedance.

The frequency detection circuit 50 is discussed below. The amplifier 56 has an output coupled to an input of each of a plurality of phase locked loops 58, 62, 64, and 66. The phase locked loops 58, 62, 64, 66 are DC output, open-collector phase locked loops, such as part number LMC567 made by National Semiconductor, Santa Clara, Calif. Each phase locked loop 58, 62, 64, and 66 has an output coupled to one end of a respective pull-up resistor 68, 72, 74, and 76. Each of the pull-up resistors 68, 72, 74, and 76 has its other end coupled to a reference voltage 69. Each phase locked loop 58, 62, 64, and 66 further has a frequency selection input coupled to a respective frequency selection circuit 77, 78, 79, and 80. Each frequency selection circuit may be an RC network of a known configuration. Phase locked loop 58 is configured by the frequency selection circuit 77 to detect a frequency of 34.5 KHz, which will be detected when the ACTIVATE REQUEST signal is being transmitted from the R-modem 34 to the C-modem 12. Phase locked loop 62 is configured by the frequency selection circuit 78 to detect a frequency of 189.75 KHz, which will be detected when the C-ACT signal is being transmitted by the C-modem 12. Phase locked loop 64 is configured by the frequency selection circuit 79 to detect a frequency of 51.75 KHz, which will be detected when the R-modem 34 is transmitting the R-ACT signal. Phase locked loop 66 is configured by the frequency selection circuit 80 to detect a frequency of 241.5 KHz, which will be detected when the C-modem 12 is transmitting the C-REVEILLE signal.

The frequency detection circuit 50 further includes a manually operable reset switch 81 supported on the case 48 and a conditioning circuit 82. The reset switch 81 is disposed so that it can be operated from outside the case. The reset switch 81 is a single pole, single throw, momentary switch of a type well known in the industry. An output of the reset switch 81 is coupled to an input of the conditioning circuit 82. The conditioning circuit 82 has an output. The conditioning circuit 82 operates to debounce the switch 81 and provide a single signal pulse in response to a single operation of the reset switch 81.

The frequency detection circuit 50 further includes a plurality of flip-flops 84, 86, 88, and 91 which act as memory devices, and which may be standard S-R flip-flops or may be other appropriate flip-flops well known in the industry. The flip-flops 84, 86, 88, and 91 have active low inputs. Flip-flop 84 has a set input 84S, a reset input 84R and an output 84Q. Similarly, flip-flops 86, 88, and 91 each have a set input (86S, 88S, 91S), a reset input (86R, 88R, 91R), and an output (86Q, 88Q, 91Q), respectively. The set input 84S is coupled to the output of phase locked loop 58. Similarly, the set input 86S is coupled to the output of the phase locked loop 62, the set input 88S is coupled to the output of the phase locked loop 64, and the set input 91S is coupled to the output of the phase locked loop 66. The reset inputs 84R, 86R, 88R, and 91R are each coupled to the output of the conditioning circuit 82.

The display portion 51 is discussed below. The flip-flop output 84Q is coupled to an input of a driver or buffer 94. Similarly, the flip-flop outputs 86Q, 88Q, and 91Q are respectively coupled to inputs of respective drivers or buffers 94, 98, and 101. Each driver 93, 96, 98, and 101 has an output coupled to a respective light emitting diode circuit 103, 106, 108, and 111, which are each a conventional circuit including a light emitting diode (LED) and associated support circuitry. The light emitting diodes of the circuits 103, 106, 108, and 111, are disposed on the case 48 such that the LEDs are externally visible. The LEDs are described in more detail in association with FIG. 3.

Figure 3:
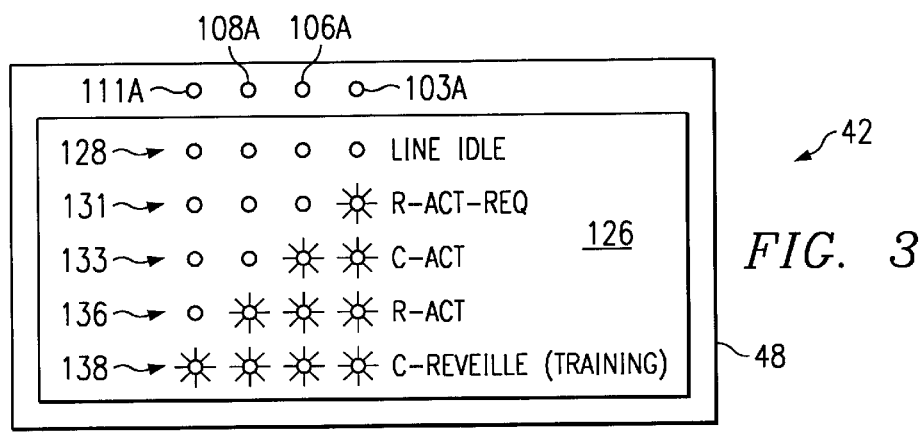
FIG. 3 is a front view of a case of the line state analyzer of FIG. 1.

FIG. 3 is a front view of the case 48 of the line state analyzer 42 of FIG. 2. The case 48 has thereon the externally visible LEDs 103A, 106A, 108A and 111A of the respective LED circuits 103, 106, 108, 111. The case 48 also has thereon a label 126 bearing operator perceptible indicia. The indicia is a legend for interpreting a plurality of patterns formed by the LEDs 103A, 106A, 108A, and 111A. The indicia includes a plurality of legends 128, 131, 133, 136, and 138 depicting various information that the LEDs 103A, 106A, 108A, and 111A convey. The significance of the legends 128, 131, 133, 136, and 138 is described in more detail in association with the description of the operation of the line state analyzer 42 below.

Figure 4:
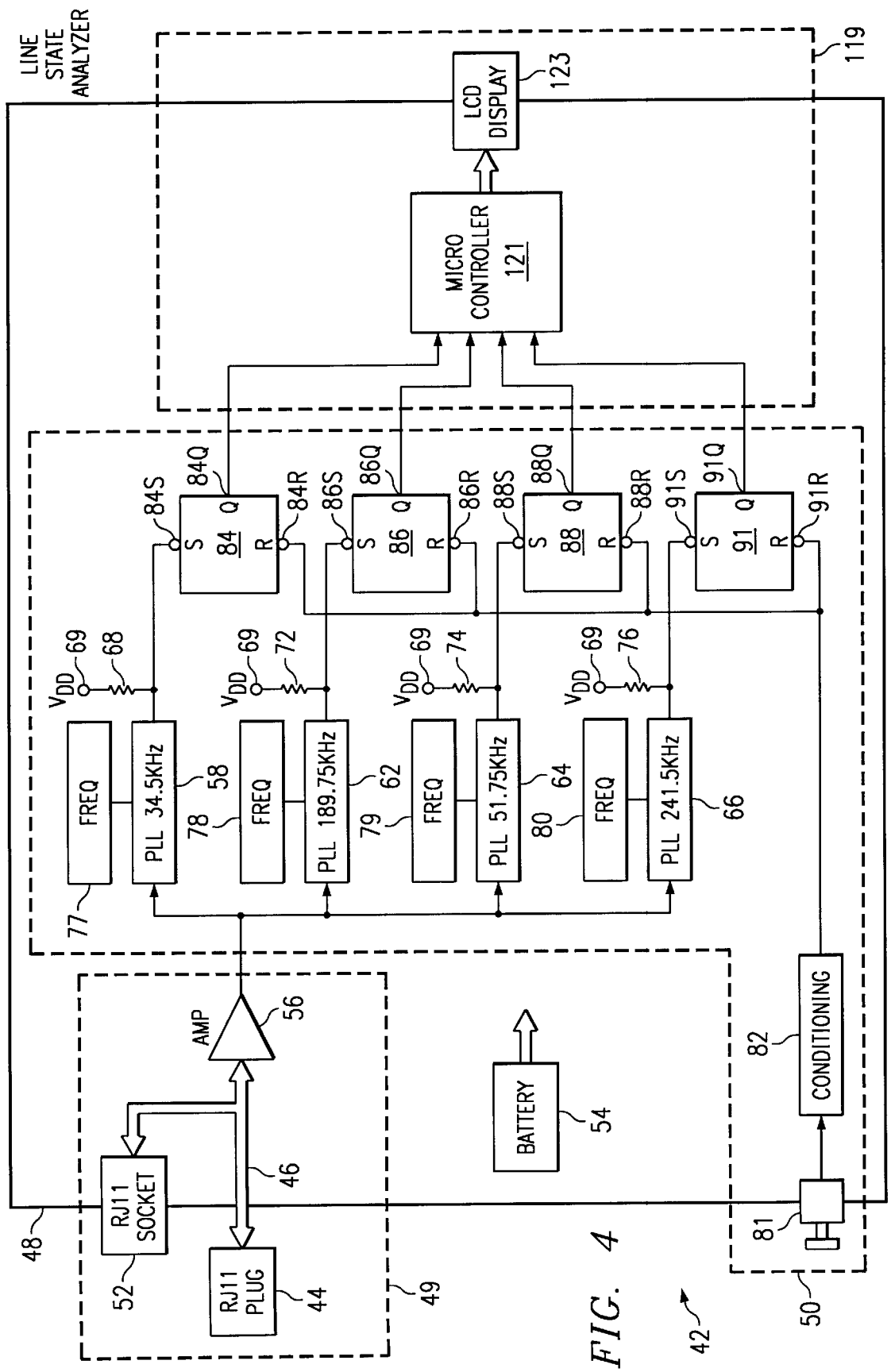
FIG. 4 is a schematic diagram of a further embodiment of the line state analyzer of FIG. 1.

FIG. 4 is a schematic diagram of a further embodiment of the line state analyzer of FIG. 1. The further line state analyzer 116 is similar in many aspects to the line state analyzer 42 of FIG. 2 and only the differences are discussed below. The line state analyzer 116 includes a case 118, an interface portion 49 identical to that in FIG. 2, a frequency detection circuit 50 identical to that in FIG. 2, and an operator perceptible portion 119 for providing an operator perceptible display. The further embodiment includes a microcontroller 121 and a liquid crystal display (LCD) 123. In the further embodiment, the flip-flop outputs 84Q, 86Q, 88Q, and 91Q are coupled to inputs of the microcontroller 121. The microcontroller 121 may be a four bit microcontroller or any other appropriate microcontroller which may be commercially available. An output of the microcontroller 121 is coupled to an input of the LCD display 123. The LCD display 123 is disposed on the case 118 such that it is externally visible and can be perceived by the operator of the line state analyzer 116.

Figure 5:
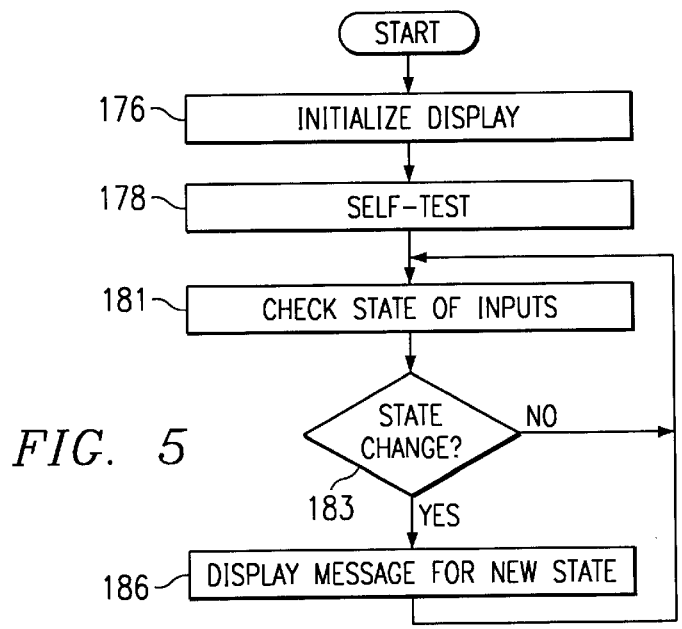
FIG. 5 is a flowchart describing the operation of a microcontroller which is a component of the line state analyzer shown in FIG. 4.

FIG. 5 is a flow chart providing a high level representation of the operation of the microcontroller 121. FIG. 5 will be discussed later in association with the operation of the embodiment of FIG. 4.

The line state analyzer 42 of FIGS. 1, 2 and 3 operates as follows.

Referring to FIGS. 1 and 2, the operation of the line state analyzer 42 is described. The plug 44 couples the line state analyzer 42 to the differential transmission line pair 26 over which the R-modem 34 and the C-modem 12 are communicating. The various pre-training signals, such as ACTIVATE REQUEST, C-ACT, R-ACT, and C-REVEILLE, are transmitted over the differential line pair 46 and through the plug 44 to the amplifier 56. In an alternate configuration, the plug 44, differential line pair 46, and socket 52 can act as a pass through for signals between the C-modem 12 and R-modem 34, which allows the line state analyzer 42 to be placed between the modem and the telecommunication system 24 in the event that an unused extra socket, such as socket 32, is not available. That is, plug 36 would be coupled to socket 52 and plug 44 to socket 28.

The differential line pair 46 also provides the signals being transmitted and received between the C-modem and R-modem 12 and 34 to the input of the amplifier 56. The amplifier 56 then amplifies each received signal and provides the amplified signal at the inputs of the phase locked loops 58, 62, 64, and 66. Each of the phase locked loops 58, 62, 64, and 66 have open collector, active low outputs. Thus, when a phase locked loop 58, 62, 64 or 66 is not detecting its respective signal the output of the phase locked loop 58, 62, 64, or 66 is pulled to a logic high by its respective pull-up resister 68, 72, 74, or 76. When the phase locked loop 58, 62, 64, or 66 is detecting its respective signal it switches to outputting a logic low.

When the phase locked loops 58, 62, 64, and 66 detect their respective signals the flip-flops 84, 86, 88, and 91 operate as respective memory devices to remember the detection of a particular frequency by a particular phase locked loop. For example, when the ACTIVATE REQUEST signal is detected by the phase locked loop 58, the phase locked loop 58 will provide an active low output to the set input 84S of the flip-flop 84. The flip-flop 84 will then output a logic high on output 84Q. The interaction of the phase locked loops 62, 64, and 66 and their associated flip-flops 86, 88, and 91 is similar. The outputs 84Q, 86Q, 88Q and 91Q are provided to the drivers 94, 96, 98, and 101, respectively. The drivers 93, 96, 98, and 101 are used to activate the LEDs 103A, 106A, 108A, and 111A, respectively. The LEDs 103A, 106A, 108A, and 111A are activated when the outputs 84Q, 86Q, 88Q, and 91Q, respectively, are providing a logical high. Thus, the LEDs provide a visible indication of which of the signals, ACTIVATE REQUEST, C-ACT, R-ACT, and C-REVEILLE, have been detected by the line state analyzer 42.

The reset switch 81 can be manually operated to clear the flip-flops 84, 86, 88, and 91 such that their outputs 84Q, 86Q, 88Q, and 91Q are outputting a logic low to the drivers 94, 96, 98, and 101, and LED circuits 103, 106, 108, and 111. Resetting the flip-flops 84, 86, 88, and 91 places the line state analyzer 42 in an initial state wherein no signals have been detected.

Referring to FIG. 3, the LEDs 103A, 106A, 108A, and 111A will display which of the signals ACTIVATE REQUEST, C-ACT, R-ACT, and C-REVEILLE have been detected by the line state analyzer 42. The operator perceptible indicia on label 126 includes the legends 128, 131, 133, 136, and 138 which will allow the operator to interpret the meaning of the pattern displayed on the LEDs 103A, 106A, 108A, and 111A. The legend 128 instructs the operator that when all of the LEDs 103A, 106A, 108A, and 111A are off the line is idle and none of the signals, ACTIVATE REQUEST, C-ACT, R-ACT, or C-REVEILLE, have been detected by the line state analyzer 42. The line idle state is the state of the line state analyzer after the reset switch 81 is used. The legend 131 instructs the operator that when only LED 103A is lit, the ACTIVATE REQUEST signal has been detected by the line state analyzer 42, but no other signals have been detected. The legend 133 shows that when only the LEDs 103A and 106A are lit, the ACTIVATE REQUEST and C-ACT signals have been detected by the line state analyzer 42. The legend 136 shows that when only LEDs 108A, 106A, and 103A are lit, the ACTIVATE REQUEST, C-ACT, and R-ACT signals have been detected by the line state analyzer 42. Legend 138 shows that when all of the LEDs 111A, 108A, 106A, and 103A are lit, ACTIVATE REQUEST, C-ACT, R-ACT, and C-REVEILLE have been all detected by the line state analyzer 42, and that the R-modem 34 and C-modem 12 have entered the training stage of the ADSL modem initialization protocol.

The further embodiment of the line state analyzer 116 of FIGS. 4 and 5 operates as follows. The operation of the line state analyzer 116 is similar to the operation of the line state analyzer 42 described in FIG. 2 and only the differences are noted below. Referring to FIG. 4, the outputs 84Q, 86Q, 88Q, and 91Q of the flip-flops 84, 86, 88, and 91, respectively, of the line state analyzer 116, instead of being provided to a plurality of drivers and LEDs as in FIG. 2, are provided to the inputs of the microcontroller 121. The microcontroller 121 interprets the meaning of the outputs 84Q, 86Q, 88Q, and 91Q and generates an appropriate message to be displayed on the LCD display 123. Suitable messages might be equivalent to those shown along the right side of label 126 in FIG. 3. The operation of the microcontroller 121 is described in more detail below in association with FIG. 5. The LCD display 123 is manipulated by the microcontroller 121 to display various operator perceptible messages indicating which signals, if any, have been detected by the line state analyzer 116. In the further embodiment the LCD display 123 displays the following messages, but any other appropriate messages in an appropriate language may be used. The message "line idle" is displayed by the LCD display 123 when the line state analyzer 116 has detected no signals or is in the initial state. The LCD display 123 displays the message "R-ACT-REQ" when the ACTIVATE REQUEST signal has been detected, but no subsequent signals were detected. The LCD display 123 displays the message "C-ACT" when the ACTIVATE REQUEST signal and the C-ACT signal have been detected, without subsequent signals. The message "R-ACT" is displayed by the LCD display 123 when the ACTIVATE REQUEST signal, C-ACT signal, and the R-ACT signal have been detected without subsequent signals. The message "C-REVEILLE" is displayed when the ACTIVATE REQUEST, C-ACT, R-ACT and C-REVEILLE signals have been detected.

FIG. 5 is a flowchart describing the operation of the microcontroller 121 of the operator information portion 119 of the further embodiment of line state analyzer 116 shown in FIG. 3. The method begins at block 176 with the initialization of the LCD display 123 by the microcontroller 121. That is, LCD display 123 is cleared of any previous message.

The method proceeds to a self-test block 178. In self-test block 178, microcontroller 121 and LCD display 123 perform standard self-checking routines to ensure proper operation. If an error is detected by the self-test routines an appropriate error message will be displayed on the LCD display 123.

Next, at block 181, the state of the inputs received by the microcontroller 121 from the flip-flops 84, 86, 88, and 91 is checked. The value being provided to the microcontroller 121 from the outputs 84Q, 86Q, 88Q, and 91Q is determined and the method proceeds to decisional block 183.

In decisional block 183, the method determines whether the current state of the inputs as determined in block 181 is different from the state of the inputs determined during the previous iteration of block 181. If block 183 is being performed for the first time and no previous value of the inputs exists, then a state change will be considered to have taken place. If the current state of the inputs, as determined by block 181, is different from the previous state of the inputs then the YES branch of decisional block 183 will be followed. If no state change is detected between the current and the previous state of the inputs then the NO branch of decisional block 183 will be followed. The NO branch of decisional block 183 returns back to block 181 so that the state of the inputs can be checked again to determine the new current state of the inputs.

The YES branch of decisional block 183 leads to display block 186. In display block 186 a message based on the current state of the inputs, as determined in block 181, is prepared for display on the LCD display 123. The message is then displayed on the LCD display 123 and the method returns back to block 181 to again determine the current state of the inputs.

The present invention provides a number of technical advantages. One such technical advantage is the capability for self-contained detection of pre-training signals being communicated between ADSL modems. A further advantage is that the present invention provides a compact, portable, inexpensive and easy-to-use apparatus for determining which pre-training signals have been communicated between two ADSL modems. Yet another advantage is a decreased time to narrow down why two ADSL modems are not communicating. Another advantage is decreased training time, and avoiding the use of oscilloscopes and frequency counters and the associated training required for proper use thereof.

Although two embodiments have been illustrated and described in detail, it should be understood that various changes, substitutions and alterations could be made therein without departing from the scope of the present invention.

For example, although the disclosed embodiments refer to the line state analyzer being contained in a case, the present invention could be integrated as part of a larger system, or used as part of an embedded application or system. In particular, the present invention could be integrated as part of an ADSL modem in order to provide integrated line state analysis functionality. Additionally, although in the disclosed embodiments the detected signals are represented on LEDs and an LCD display, any other output method could be used, such as sound. Moreover, an inductive coupling interface could be used instead of the plug and socket system of the disclosed embodiments.

It should also be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. An apparatus comprising:
   a communications line interface which can be operatively coupled to a communications line; and
   a frequency detection circuit operatively coupled to said interface and having an output, said frequency detection circuit being operable to detect through said interface an occurrence of each of a plurality of predetermined frequencies on said communications line and to provide to said output an indication of each said frequency which has been detected, wherein said frequency detection circuit includes: a plurality of phase locked loops, each said phase locked loop having an input coupled to said interface, having an output, and being operable to detect a respective one of said frequencies; and a plurality of memory devices, each said memory device having an input coupled to said output of a respective one of said phase locked loops, being operable to store the output of said phase locked loop connected thereto, and each said memory device having an output;
   wherein said interface includes a first coupling part which can be operatively coupled to the communications line, a second coupling part which can be operatively coupled to the communications line, and an amplifier having an input operatively coupled to said first and second coupling parts, and having an output coupled to said input of each said phase locked loop;
   further including a reset circuit, said reset circuit including a manually operable reset input portion and said reset circuit being operable to reset each said memory device in response to manual operation of reset input portion;
   wherein said manually operable reset input portion includes a manually operable switch, and wherein said reset circuit includes a conditioning circuit, said conditioning circuit having an input coupled to said switch and having an output coupled to a reset input of each said memory device, said conditioning circuit being operable to debounce said switch;
   wherein said frequency detection circuit further includes a plurality of pull-up resistors, each said pull-up resistor having a first end coupled to a voltage source and having a second end, and includes a plurality of frequency selection circuits, each said phase locked loop having a further input operatively coupled to a respective one of said frequency selection circuits, said frequency selection circuits being operable to determine which of said predetermined frequencies each said phase locked loop detects, and said output of each said phase locked loop being an open collector output coupled to said second end of a respective one of said pull-up resistors, wherein each said phase locked loop outputs a first voltage level when detecting the predetermined frequency associated therewith and outputs a second voltage level when detecting a frequency other than the predetermined frequency associated therewith, wherein said memory devices are flip-flops, each said flip-flop having a set input coupled to said output of a respective one of said phase locked loops, having a reset input which is said input coupled to said output of said conditioning circuit, and having an output coupled to said input of a respective one of said drivers, wherein said reset switch is a single pole, single throw momentary switch, and wherein said first coupling part and said second coupling part are both industry standard connectors.

2. An apparatus according to claim 1, further including a result output circuit, wherein said result output circuit includes:

a plurality of drivers, each said driver having an input coupled to said output of a respective one of said memory devices and having an output; and a plurality of light-emitting diodes, each said light-emitting diode having an input coupled to said output of a respective one of said drivers, and being operable to display a indication of whether a respective one of said frequencies has been detected by said frequency detection circuit.

3. An apparatus according to claim 1, further including;

a processor circuit having an output and having a plurality of inputs, each said input of said processor circuit being coupled to said output of a respective one of said memory devices, said processor circuit being operable to output a representation of which of said frequencies have been detected; and a display coupled to said output of said processor circuit and being operable to display an operator perceptible indication of which of said frequencies have been detected.

4. An apparatus according to claim 3, wherein said display is a liquid crystal display and wherein said processor circuit is a microcontroller.

5. An apparatus according to claim 1, further including a result output circuit operatively coupled to said frequency detection circuit, and operable to output an operator perceptible indication of which of said frequencies have been detected.

6. A self-contained line state analyzer comprising:

a communications line interface which can be operatively coupled to a communications line and which includes analog circuitry;

an operator information portion; and a circuit portion which is operatively coupled to said interface and said operator information portion, which includes analog circuitry operable to automatically detect through said analog circuitry of said interface an occurrence on said communications line of an analog signal at a predetermined frequency, and which is operable to automatically provide on said operator information portion an operator perceptible indication of whether a signal at the predetermined frequency has been detected;

wherein said analog circuitry of said circuit portion includes a plurality of phase locked loops, each said phase locked loop having an input coupled to said interface and having an output, and each said phase locked loop being operable to detect a signal at a respective one of said frequencies;

wherein said circuit portion includes a plurality of memory devices, each said memory device having an input coupled to said output of a respective one of said phase locked loops, being operable to store the output of said phase locked loop connected thereto, and having an output;

further including a reset circuit, said reset circuit including a manually operable reset input portion and being operable to reset each said memory device in response to manual operation of said reset input portion;

wherein said reset circuit includes a manually operable reset switch and a conditioning circuit, said conditioning circuit having an input coupled to said reset switch and having an output coupled to a reset input of each said memory device and being operable to debounce said reset switch;

wherein said analog circuitry of said circuit portion further includes a plurality of pull-up resistors each having a first end coupled to a voltage source and having a second end, and includes a plurality of frequency selection circuits, each said phase locked loop having a further input operatively coupled to a respective one of said frequency selection circuits, said frequency selection circuits being operable to determine which of said predetermined frequencies each said phase locked loop detects, and said output of each said phase locked loop being an open collector output coupled to said second end of a respective one of said pull-up resistors;

wherein each said phase locked loop outputs a first voltage level when detecting the predetermined frequency associated therewith and outputs a second voltage level when detecting a frequency other than the predetermined frequency associated therewith;

wherein said memory devices are flip-flops, each said flip-flop having a set input coupled to said output of a respective one of said phase locked loops, having a reset input which is said input coupled to said output of said conditioning circuit, and having an output coupled to said input of a respective one of said drivers;

wherein said reset switch is a single pole, single throw momentary switch; and wherein said interface includes first and second coupling parts which can each be operatively coupled to the communications line, said first coupling part and said second coupling part both being industry standard connectors.

7. A self-contained line state analyzer according to claim 6, wherein said operator information portion includes:

a plurality of drivers, each said driver having an input coupled to said output of a respective one of said memory devices and having an output; and a plurality of light-emitting diodes, each said light-emitting diode having an input coupled to said output of a respective one of said drivers, and each said light-emitting diode being operable to display a indication of whether a respective one of said frequencies has been detected by said circuit portion.

8. A self-contained line state analyzer according to claim 6, wherein said interface includes an amplifier which is part of said analog circuitry of said interface, which has an input operatively coupled to each of said first and second coupling parts and which has an output coupled to said input of each said phase locked loop.

9. A self-contained line state analyzer according to claim 6, wherein said operator information portion further includes:

a processing circuit having a plurality of inputs, each said input being coupled to said output of a respective one of said memory devices, said processing circuit having an output and being operable to output a representation of which of said frequencies have been detected; and an operator perceptible display coupled to said output of said processing circuit, said display being operable to display an operator perceptible indication of which of said frequencies have been detected.

10. A self-contained line state analyzer according to claim 6, further including a housing for said interface, said circuit portion and said operator information portion, wherein said operator perceptible indication is perceptible from externally of said housing, and wherein said interface is accessible from externally of said housing.

11. A self-contained line state analyzer according to claim 6, including operator perceptible indicia disposed on an outside of said housing, said operator perceptible indicia providing information relating to said operator information portion.

* * * * *